United States Patent

[11] 3,588,703

[72] Inventors Morris Sorkin
Santa Monica;
Gary Lindstrom, Palos Verdes Estates, both of Calif.

[21] Appl. No. 635,159
[22] Filed May 1, 1967
[45] Patented June 28, 1971
[73] Assignee TRW Inc.
Redondo Beach, Calif.

[54] PHASE SYNCHRONIZATION SYSTEM
9 Claims, 4 Drawing Figs.

[52] U.S. Cl. ........................................ 325/58, 325/12, 325/15, 325/17
[51] Int. Cl. ........................................ H04b 1/00
[50] Field of Search ........................................ 325/12, 15, 17, 58, 15 (SAT), 67, 63, 1—16; 343/7.5, 100 (SAT), 175, 179; 178/69.5 (DC), 69.5

[56] References Cited
UNITED STATES PATENTS
3,378,837 4/1968 Graves ........................ 343/7.5

*Primary Examiner*—Robert L. Griffin
*Assistant Examiner*—Albert J. Mayer
*Attorneys*—Daniel T. Anderson, Terry A. Dinardo and Gerald Singer

ABSTRACT: A system for phase synchronizing a first signal generated at a first station with a second signal generated at a second station. The system employs a closed loop in which a phase information signal is transmitted from the first to the second station and then retransmitted from the second station back to the first station. Use of this closed loop technique compensates for transmission path delays and enables phase synchronization between signals locally generated at spaced apart stations.

INVENTOR.
MORRIS SORKIN
GARY LINDSTROM
BY Lindenberg & Freilich
ATTORNEYS

INVENTOR.
MORRIS SORKIN
GARY LINDSTROM
BY Lindenberg & Freilich
ATTORNEYS

PHASE SYNCHRONIZATION SYSTEM

BACKGROUND OF THE INVENTION,

Field of the Invention

Various applications exist which require the phase synchronization of two signals respectively generated at first and second spaced stations either fixed or moving relative to one another. Such phase synchronization is often required, for example, in certain missile and satellite tracking systems. One such tracking system is disclosed in U.S. Pat. No. 3,378,837 by Ross E. Graves and assigned to the same assignee as the present invention.

The primary difficulty involved in phase synchronizing signals generated at spaced stations involves compensating for transmission path or propagation delays. An object of the present invention is to provide a phase synchronizing system which inherently compensates for such delays.

SUMMARY OF THE INVENTION

Briefly, in accordance with the present invention, a system for phase synchronizing a first or reference signal with a second signal is provided. The system employs a closed loop signal path in which a phase information signal is transmitted from a first to a second station and is then retransmitted from the second station back to the first station. The retransmitted signal is mixed with the reference signal at the first station to form the phase information signal in a manner to compensate for any transmission path delays.

In a preferred embodiment of the invention, a first signal generated at a first station is mixed with an incoming signal to provide a phase information signal of one-half the frequency of the first signal and having a phase advanced by the angle which the incoming signal lags the first signal. This phase advanced phase information signal is transmitted to a second station and retransmitted therefrom to the first station. Assuming the transmission path to introduce equal delays in both directions, the retransmitted signal received at the first station will constitute the previously referred to incoming signal having a frequency equal to one-half the frequency of the first signal with the phase advance of the phase information signal removed.

In accordance with a significant feature of one embodiment of the invention, means are provided for automatically correcting for errors introduced due to the motion of a body (e.g. a satellite) incorporated in the transmission path between the first and second spaced stations.

DESCRIPTION OF THE PREFERRED EMBODIMENTS

A typical application in which it would be necessary, or at least desirable, to phase synchronize two spaced signal generators is in an accurate worldwide system of electronic clocks where it may be desired to synchronize all clocks to a precision of, e.g. 1 to 10 microseconds. Such a system can be built around the use of atomically stabilized clocks, one of which is used as a master, and the others as slaves. Synchronization of the slave clocks can be effected by transmission of timing signals from the master to the slave station via an orbiting satellite for example. In such a system, it is of course necessary to compensate for the delay in transmission of the timing signals. The present invention is directed to a system for effecting such synchronization between the master and slave stations. Although the use of a satellite in the transmission path may be desirable in some system applications, it is pointed out that the synchronization system disclosed herein is useful in other applications where the transmission path may include other moving bodies, such as airplanes or, on the other hand, constitute a direct transmission path; i.e. not include any moving bodies.

Although, in accordance with the invention, the types of signals to be synchronized could take many forms, the use of continuous wave (CW) tones will be assumed herein. Utilization of CW tones for coupling timing information from one station to another can provide a system which is both simple and capable of great accuracy.

Figure 1:
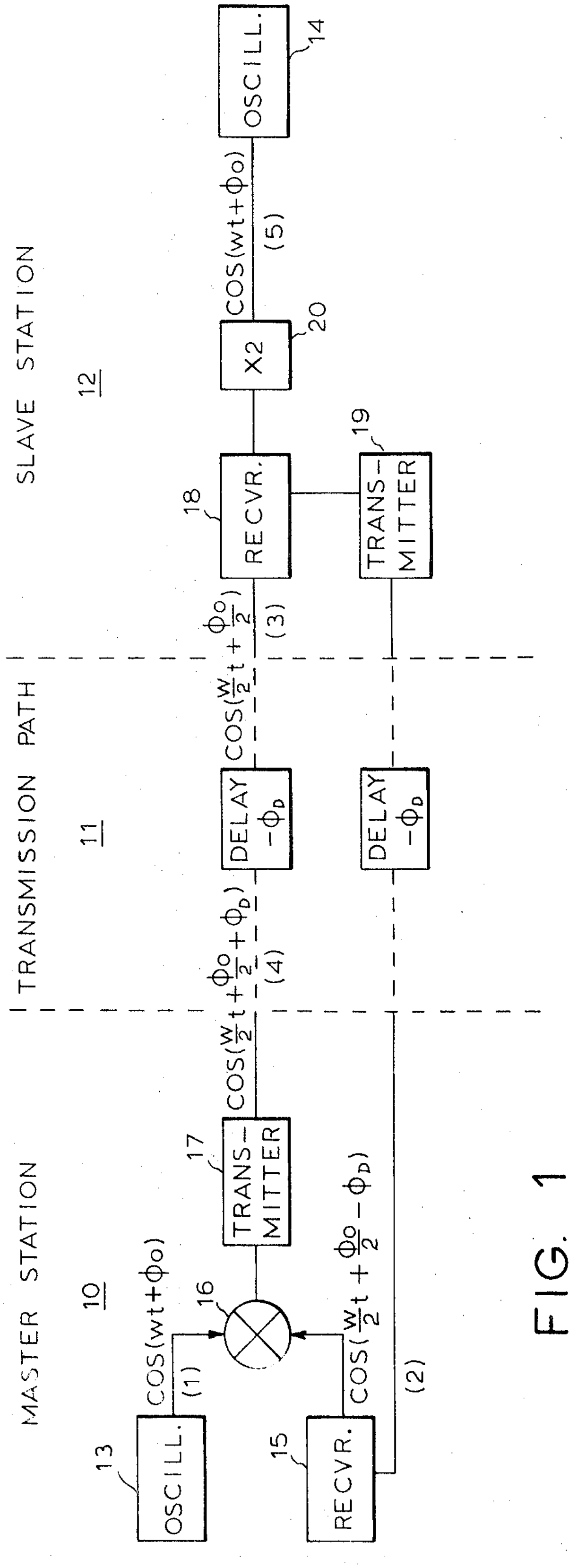
FIG. 1 is a block diagram of a preferred phase synchronizing system in accordance with the invention.

Attention is now called to FIG. 1 which comprises a block diagram of a system in accordance with the invention for phase synchronizing clocks or electronic oscillators respectively located at a master station 10 and a slave station 12 remote therefrom. It will be noted that the master station 12 is comprised of a local oscillator 13, a signal receiver 15, a mixer circuit 16, and a signal transmitter 17. The station 12 is comprised of a signal receiver 18, a signal transmitter 19, a multiplier or frequency doubler 20 and the previously mentioned local oscillator 14. It is contemplated that the oscillators 13 and 14 respectively located at the stations 10 and 12 be very stable, e.g. atomically stabilized, over short durations. The purpose of a system in accordance with the invention is to provide the phase reference of the tone generated at the master station 10 to the slave station 12 in order to maintain the locally generated tones synchronized over relatively long durations. Conventional methods can be used at the slave station to periodically reset the phase of the signal generated thereat to bring it into time coincidence with the tone generated at the master station. In the transmission of such reference phase or timing information from the master to the slave station, it is necessary to compensate for transmission path time delays if accuracies on the order of microseconds are to be achieved. This can be appreciated when it is realized that a delay of approximately 1 millisecond is introduced in the transmission of information from a master station to a slave station 165 nautical miles away. In accordance with the basic concept of the present invention, transmission path time delays are compensated for by utilizing a closed loop system in which timing information transmitted from the master station is retransmitted from the slave station and appropriately combined with the original master station signal to eliminate the effects of the transmission path time delay.

More particularly, consider a master signal (which will be assumed to be a sine wave) having a frequency $\omega$ generated by the master station oscillator 13. The phase of this signal can at any time $t$ be represented by $$\cos(\omega t+\Phi_0). \quad (1)$$

As shown in FIG. 1, this signal is applied to the mixer circuit 16. A second signal (2) input applied to the mixer circuit 16 is derived from receiver 15 which, under steady state conditions, is represented by $$\cos\left(\frac{\omega}{2}t+\frac{\phi_0}{2}-\phi D\right) \qquad (2)$$

The signal (2) constitutes a signal (3)

$$\cos\left(\frac{\omega}{2}t+\frac{\phi_0}{2}\right) \qquad (3)$$

delayed by a transmission path delay angle $\Phi_D$ introduced by the transmission path 11. The mixer circuit 16 provides an output signal (4)

$$\cos\left(\frac{\omega}{2}t+\frac{\phi_0}{2}+\phi D\right) \qquad (4)$$

which is transmitted to the slave station 12 via the transmission path 11 and in the course of transmission (assuming an equal transmission delay in both directions) a path delay phase angle $\Phi_0$ is introduced. Thus, the previously referred to signal (3) is received by receiver 18 at the slave station where it is retransmitted by transmitter 19 via the transmission path back to the receiver 15. In addition, the signal (3) is applied to a multiplier 20 which yields the signal (5)

$\cos(\omega t+\Phi_0)$ (5)

which of course has a phase identical to the master signal (1) and can be used to control the oscillator 14.

It should be apparent that in a steady state condition, the signal (2) applied to the mixer 16 will have the correct frequency and phase to cause the mixer 16 to yield the signal (4) to maintain the loop in the steady state condition. The start of the loop action can be by means of noise, transients, or if need be by injection of a synthesized frequency somewhere within the loop that will initiate the closed loop action.

It will be recognized that in any closed loop or feedback system, the possibility of oscillation or instability exists and as a consequence a filter can be incorporated anywhere in the closed loop which effectively provides an adequate phase margin when the open loop gain becomes unity.

The description of FIG. 1 has made no mention of the particular characteristics of the transmission path 11. Thus, the diagram of FIG. 1 is intended to refer to either a system in which there is direct transmission between stations 10 and 12 or alternatively to a system in which transmission between the stations 10 and 12 is via some intermediate station which can comprise a moving body such as an orbiting satellite or an airplane. In the event the transmission path 11 includes a moving body, significant errors due to the motion of such a body can be introduced.

Figure 2:
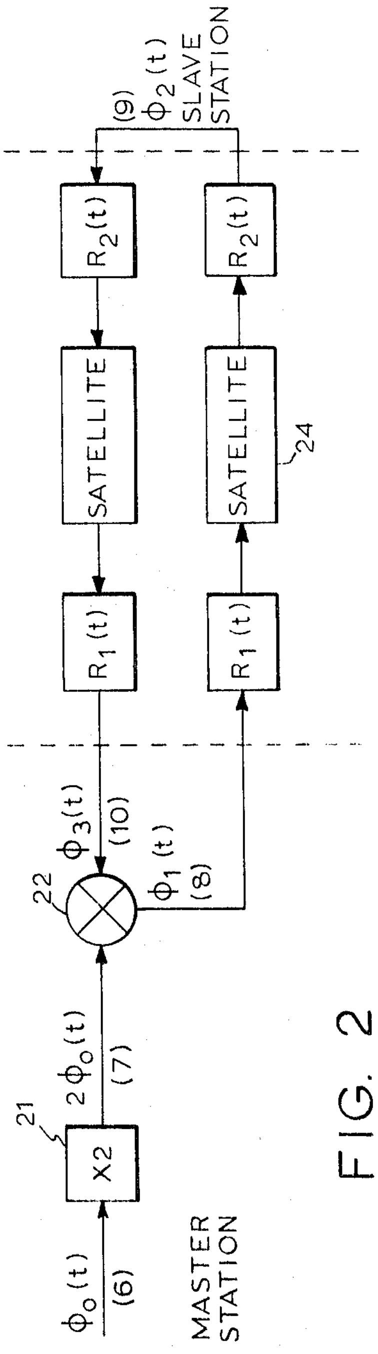
FIG. 2 is a block diagram illustrating a system similar to that shown in FIG. 1 but however incorporating a moving body in the transmission path.

More particularly, consider the system of FIG. 2 in which the phase of the master tone is represented by $\Phi_0(t)$. (6)

In the embodiment of FIG. 2, the master tone is coupled through a multiplier 21 to yield the signal $2\Phi_0(t)$ (7)

which is applied to the input of a mixer circuit 22. The output $\Phi_1(t)$ (8)

of the mixer circuit 22 is applied to the transmission path which will be assumed to include a satellite 24. Let it be defined that the signal (8) is transmitted from the mixer circuit 22 through a first distance $R_1$ to the satellite 24 and therefrom through a second distance $R_2$ to the slave station where the signal $\Phi_2(t)$ (9)

is yielded. Assume that signal (9) is retransmitted back to the mixer circuit 22 via the same transmission path; that is, through the distance $R_2$ to the satellite 24 and thence through the distance $R_1$ to yield signal $\Phi_3(t)$ (10)

at the mixer circuit 22 at the master station.

In order to determine the phase error due to satellite range rate $\dot{R}$, i.e. the component of satellite velocity along a line of sight to the master station, consider the phase $\Phi_2$ at an instant in time when a wave front takes a time interval $\tau_2$ to travel from the satellite to the slave station.

It can be seen from FIG. 2 that at that instant the phase $$\phi_2(t)=\phi_1(t)-\frac{R_1(t-\tau_2)f_1}{c}-\frac{R_2(t-\tau_2)f_1}{c} \qquad (I)$$

where phases are in cycles of the corresponding frequencies and $R_1(t)$ is distance between master station and satellite at time $t$ and $R_2(t)$ is distance between satellite and slave station at time $t$.

$$\tau_2=\frac{R_2(t-\tau_2)}{c}$$

where $R_2(t-_2)$ is the range from satellite to slave station. Now assuming constant range rate, $\dot{R}$ $R_1(t\tau_2)=R_1(t)-\dot{R}_1(t)\tau_2$ (II)

and $R_2(t-\tau_2)=R_2(t)-\dot{R}_2(t)\tau_2$ (III)

Also, assume at the same instant in time, a wave front takes a time interval $\tau_1$ to travel from the satellite to the master station. Thus, the phase $$\phi_3(t)=\phi_2(t)-\frac{R_2(t-\tau_1)f_2}{c}-\frac{R_1(t-\tau_1)f_2}{c} \qquad (IV)$$

where phases are in cycles of the corresponding frequencies and $$\tau_1=\frac{R_1(t-\tau_1)}{c}$$

where $R_1(t-\tau_1)$ is the range from satellite to master station. Similarly to equations (II) and (III)

$R_2(t-\tau_1)=R_2(t)-\dot{R}_2(t)\tau_1$ (V)

and $R_1(t\tau_1)=R_1(t)-\dot{R}_1(t)\tau_1$ (VI)

Figure 3:
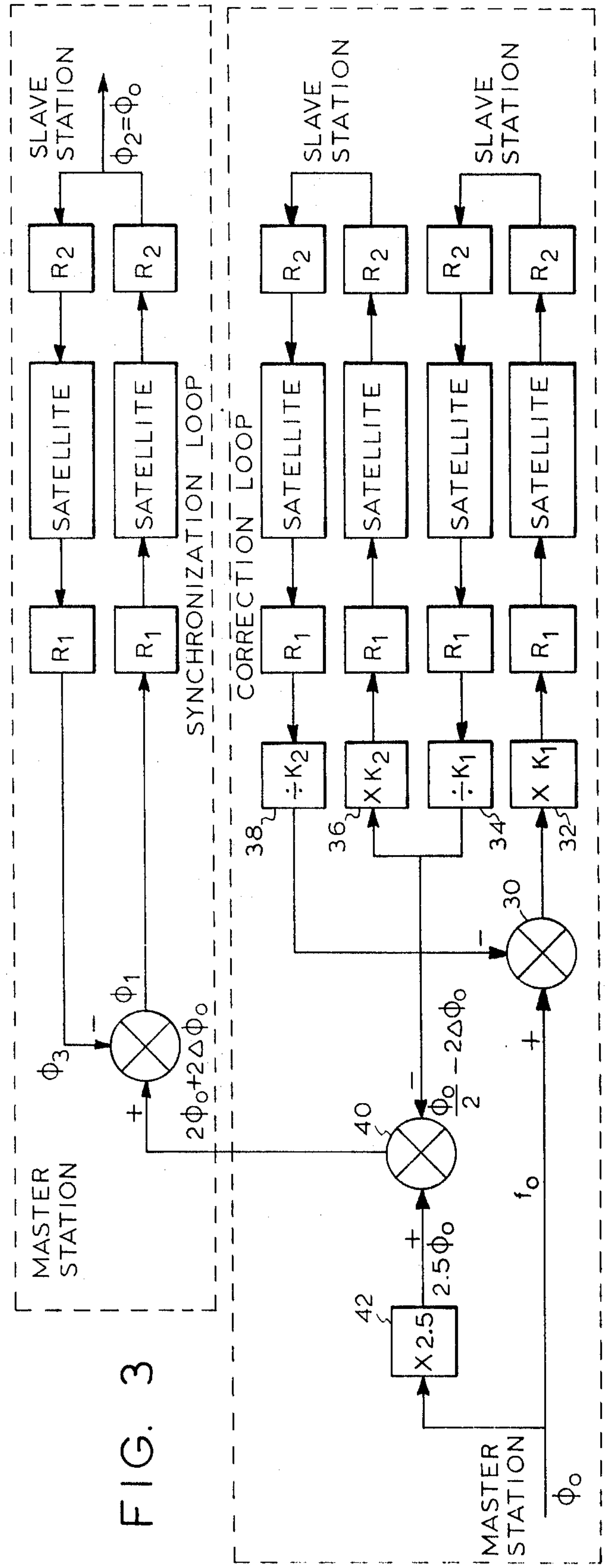
FIG. 3 is a block diagram of a further embodiment of the invention incorporating means for automatically correcting for motion induced phase error.

From the foregoing, it can be shown by mathematical analysis that the phase error $\Delta\Phi_0$ of the signal applied to the slave station with respect to the master signal is $$\Delta\phi_0=\phi_0-\phi_2=\frac{f_0R_1(\beta_1+\beta_2)}{c(1+\beta_1\beta_2)}\text{ cycles} \qquad (VII)$$

where $f_0$ = reference frequency at the master station $R_1$ = distance from master station to satellite at time $t$ $\beta_1=\frac{\dot{R}_1}{c}$ where $\dot{R}_1$ is range rate from master station to satellite $\beta_2=\frac{\dot{R}_2}{c}$ where $\dot{R}_2$ is range rate from slave station to satellite In view of equation VII, it should be appreciated that the signal received at the slave station can be corrected by conventional data reduction techniques if the data required by equation VII is externally supplied. Attention is now called to FIG. 3 which illustrates an alternate embodiment of the invention capable of eliminating the phase error due to satellite motion by the use of a somewhat more complex phase synchronization technique than has been illustrated in FIGS. 1 and 2. The system of FIG. 3 has the advantage over the previously discussed systems in that knowledge of range and range rate are not necessary, thus eliminating measurement, or storage and programming equipment, otherwise needed at the master or slave station to adequately perform error correction by data reduction. The basic concept involved in the system of FIG. 3 is to derive the reference input for the phase synchronization loop (i.e. the loop employed in FIG. 2, for example) from an extra correction loop, rather than directly from the master station oscillator. Previously referred to equation VII showed that the phase synchronization loop can maintain the phase $\Phi_2$ at the slave station equal to that at the master station, i.e. $\Phi_0$ except for an error $\Delta\Phi_0$ given by equation VII. If the reference phase input to the phase synchronization loop was changed by 2 $\Delta\Phi_0$, then the phase at the slave station would be changed by $\Delta\Phi_0$ so as to exactly cancel the phase error. The correction loop shown in FIG. 3 produces the desired phase advance $2\Delta\Phi_0$ at the master station.

In the correction loop, the master signal frequency $fo$, is sent twice around the path between master and slave station via the satellite, before closing the loop at mixer 30 whose output is transmitted to the slave station. In order to separate the signals in the two paths of the correction loop between the master and slave stations, the frequency $fo$ is offset by a factor $K_l$ in multiplier 32 on the outgoing leg of first round trip path. The returned signal is divided by the same factor $K_l$ in divider 34. The outgoing signal on the second round trip path is multiplied by a factor $K_2$ by multiplier 36 and then divided by factor $K_2$ by divider 38 on its return leg.

For the correction loop, the phase error at the midpoint of the loop (i.e. at the output of divider 34 and input of multiplier 36) is available at the master station, and phase error with respect to the reference phase $\Phi_0$ can, by mathematical analysis, be shown to equal $2\Delta\Phi_0$. The phase of the signal at the midpoint of the correction loop at the output of divider 34 is therefore $\frac{\phi_0}{2}-2\Delta\phi_0$.

This signal is applied to mixer 40 whose other input equals $2.5\phi_0$ being derived from the output of a multiplier 42. The difference output of mixer 40, i.e., $2\phi_0 + 2\Delta\phi_0$, is used as the input to the synchronization loop and is precisely the input required to cancel the phase error in the synchronization loop.

Figure 4:
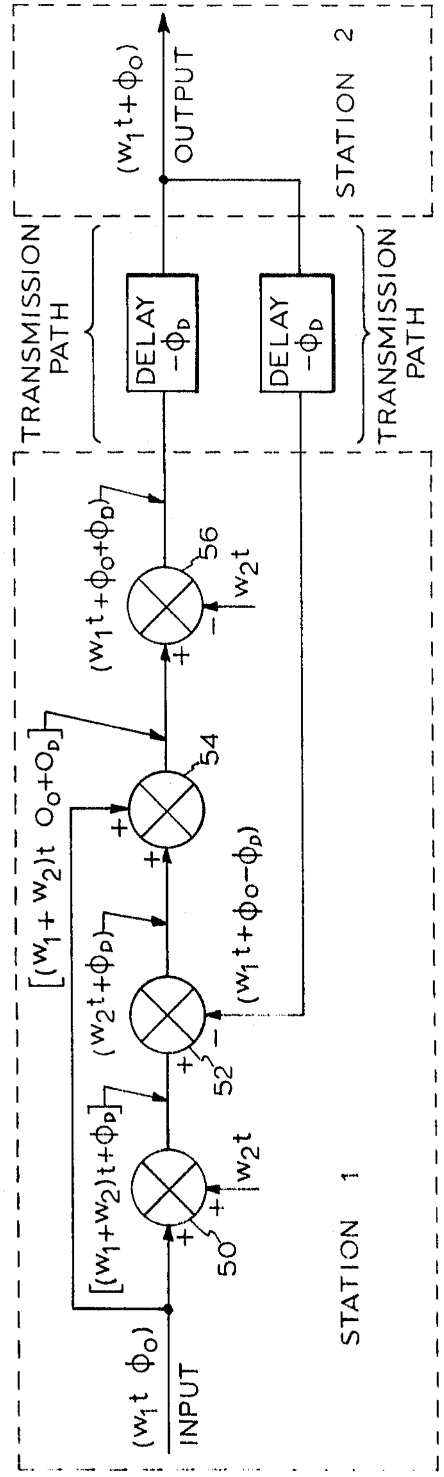
FIG. 4 is a block diagram of a still further embodiment of the invention.

Attention is now called to FIG. 4 which illustrates a further embodiment of the invention, also employing a closed loop arrangement for compensating for transmission path delays. The arrangement of FIG. 4 however combines the retransmitted reference input signal with the master station signal in a different manner than hereinbefore disclosed. More particularly, in lieu of employing the multiply-by-two circuit at either the master or slave station which have been employed in the embodiments thus far discussed, the transmitted signal is derived at the master station by the inclusion of additional mixers. In the system of FIG. 4, the master station signal, of phase $\omega_1 t + \phi_0$, is applied to a first mixer 50. A signal of phase $\omega_2 t$ is also applied to the first mixer yielding an output signal of phase $(\omega_1 + \omega_2)t + \phi_0$ which is in turn applied to a mixer 52.

A second input signal applied to the mixer 52 constitutes the signal retransmitted from the slave station and derived from the transmission path. This signal's phase is $(\omega_1 t + \phi_0 - \phi_D)$ where $\phi_D$ represents the transmission path phase delay angle. Thus, the mixer 52 provides an output signal of phase $\omega_2 t + \phi_D$ to a mixer 54. The master signal of phase $\omega_1 t + \phi_0$ is also applied to the mixer 54. Thus, as should be apparent, the mixer 54 provides an output signal of phase $(\omega_1 + \omega_2)t + \phi_0 + \phi_D$. This signal is applied to a mixer 56 along with the signal of phase $\omega_2 t$ to thus generate an output signal of phase $\omega_1 t + \phi_0 + \phi_D$ which is transmitted to the slave station over the transmission path having a path phase delay angle $\phi_D$. Thus the signal of phase $\omega_1 t + \phi_0$ corresponding to the master station signal will be received at the slave station and transmitted via the transmission path back to the mixer 52. It should be apparent that the retransmitted signal from the slave station to the master station is of a phase and frequency suitable to maintain the closed loop in a steady state condition. As was previously discussed in connection with FIG. 1, noise, transients, or an injected signal if necessary, will initiate the closed loop action. It is pointed out that the embodiment of FIG. 4 neglects any phase error introduced due to satellite motion. It will be appreciated however that any such error could be compensated for as hereinbefore mentioned.

From the foregoing, it should be apparent that several embodiments of a system have been disclosed herein for phase synchronizing a signal generated at a first station with a signal generated at a remotely located second station. All of the embodiments of the invention are characterized by the utilization of a closed loop arrangement in which a timing signal is transmitted from a master station to a slave station and retransmitted via substantially the same transmission path back to the master station where it is combined with the master station signal to substantially compensate for transmission path delays. Although the use of continuous signals has been assumed herein for convenience, the invention is not restricted to the use of such signals and intermittent signals of various types can be employed consistent with the teachings of the invention. Additionally, although the disclosed embodiments have assumed the existence of two fixed ground stations and perhaps a moving intermediate station, it should be appreciated that the system is useful in other configurations also. For example, the stations may be moving relative to one another as where it may be desired to synchronize a ground station clock with a satellite clock. Thus, while particular embodiments of the invention have been illustrated and described herein, it should be understood that many modifications and variations may occur to those skilled in the art and it is thus intended that the scope of the invention be limited only by a just interpretation of the appended claims.

We claim:

1. A phase synchronization system comprising:

a transmitter at a master station for transmitting a phase information signal over a transmission path, having an inherent phase delay, to a slave station;

means at said slave station for receiving said phase information signal, phase delayed by said transmission path, and for retransmitting the received phase delayed phase information signal over said transmission path to said master station;

a receiver at said master station for receiving the retransmitted signal phase delayed by said transmission path;

a fixed frequency oscillator at said master station; and means at said master station for mixing the output of said fixed frequency oscillator with the output of said receiver at said master station to produce said phase information signal.

2. The system of claim 1 wherein the output of said fixed frequency oscillator is defined by cos $\omega\tau+\Phi_o$, said retransmitted signal phase delayed by said transmission path is defined by $$\cos \frac{\omega}{2}\tau + \frac{\phi_0}{2} + \phi_D$$

and said phase information signal is defined by $$\cos \frac{\omega}{2} + \frac{\phi_0}{2} - \phi_D$$

where $\Phi_D$ represents the phase delay of said transmission path.

3. The system of claim 2 including a multiplier at said slave station responsive to said received phase information signal phase delayed by said transmission path for doubling the frequency of said received phase information signal to produce a signal in phase coincidence with said output of said fixed frequency oscillator.

4. The system of claim 1 wherein said transmission path includes an intermediate station in motion relative to said master and slave stations.

5. The system of claim 4 including means for correcting for phase errors introduced by the motion of said intermediate station.

6. The system of claim 5 wherein said correction means includes closed loop means for transmitting information from said master to said slave station and from said slave to said master station.

7. In a system for phase synchronizing a first signal locally generated at a first station with a second signal locally generated at a second station spaced by a transmission path, having an inherent phase delay, from said first station;

first transmitter means at said first station for transmitting a phase information signal via said phase delaying transmission path to said second station;

second receiver means at said second station for receiving said phase information signal phase delayed by said transmission path and second transmitter means at said second station for retransmitting said phase delayed phase information signal, received by said second receiver means, via said phase delaying transmission path back to said first station;

first receiver means at said first station for receiving said retransmitted signal phase delayed by said transmission path;

a fixed frequency oscillator at said first station for generating said first signal;

means at said first station for mixing said first signal and the output of said means at said first station for receiving said retransmitted signal phase delayed by said transmission path to generate said phase information signal; and said transmitter means at said first station transmits said phase information signal.

8. The system of claim 7 wherein said transmission path includes an intermediate station in motion relative to said first and second stations.

9. The system of claim 8 including correction means for phase varying said first signal prior to it being mixed with said retransmitted signal to compensate for phase errors introduced by the motion of said intermediate station.